(12) United States Patent
Fukushima et al.

(10) Patent No.: US 12,049,331 B2
(45) Date of Patent: Jul. 30, 2024

(54) SPACECRAFT AND CONTROL SYSTEM

(71) Applicants: SKY Perfect JSAT Corporation, Tokyo (JP); RIKEN, Wako (JP)

(72) Inventors: Tadanori Fukushima, Tokyo (JP); Jun Yamada, Tokyo (JP); Daisuke Hirata, Tokyo (JP); Toshikazu Ebisuzaki, Wako (JP); Satoshi Wada, Wako (JP)

(73) Assignees: SKY Perfect JSAT Corporation, Tokyo (JP); RIKEN, Wako (JP)

( * ) Notice: Subject to any disclaimer, the term of this patent is extended or adjusted under 35 U.S.C. 154(b) by 247 days.

(21) Appl. No.: 17/423,995

(22) PCT Filed: Jan. 21, 2019

(86) PCT No.: PCT/JP2019/001655
§ 371 (c)(1),
(2) Date: Jul. 19, 2021

(87) PCT Pub. No.: WO2020/152744
PCT Pub. Date: Jul. 30, 2020

(65) Prior Publication Data
US 2022/0127018 A1  Apr. 28, 2022

(51) Int. Cl.
*B64G 1/10* (2006.01)
*B64G 1/24* (2006.01)
*B64G 1/66* (2006.01)

(52) U.S. Cl.
CPC .............. *B64G 1/24* (2013.01); *B64G 1/10* (2013.01); *B64G 1/66* (2013.01)

(58) Field of Classification Search
CPC ...... B64G 1/1081; B64G 1/1078; B64G 1/10; B64G 1/66
See application file for complete search history.

(56) References Cited

U.S. PATENT DOCUMENTS 5,153,407 A * 10/1992 Schall .................. B64G 1/68
                                                    219/121.85
5,421,540 A    6/1995 Ting
(Continued)

FOREIGN PATENT DOCUMENTS

CN    104155747 A    11/2014
CN    106181075 A    12/2016
(Continued)

OTHER PUBLICATIONS

Wikipedia, United States Space Surveillance Network, Aug. 31, 2018, [web.archive.org/web/20180831060219/https://en.wikipedia.org/wiki/United_States_Space_Surveillance_Network] (Year: 2018).*
(Continued)

*Primary Examiner* — Timothy D Collins
*Assistant Examiner* — Justin Michael Heston
(74) *Attorney, Agent, or Firm* — MARSHALL, GERSTEIN & BORUN LLP

(57) ABSTRACT

A spacecraft for changing an orbit or an attitude of a target in outer space by irradiating the target with a laser, the spacecraft includes: a laser apparatus configured to generate the laser; a focusing unit configured to converge the laser; a detecting unit configured to acquire detection information including a distance between the spacecraft and the target; and an irradiation control unit configured to control the focusing unit on the basis of the distance so that the laser converges on the target.

10 Claims, 11 Drawing Sheets

(56) References Cited

U.S. PATENT DOCUMENTS

| | | | |
|---|---|---|---|
| 2011/0121139 A1 | 5/2011 | Poulos | |
| 2011/0302906 A1* | 12/2011 | Sinko | B64G 1/646 |
| | | | 60/204 |
| 2012/0286098 A1* | 11/2012 | Poulos | B64G 1/646 |
| | | | 244/158.1 |
| 2017/0081051 A1 | 3/2017 | Okada | |
| 2018/0222604 A1* | 8/2018 | Garus | B64G 1/646 |

FOREIGN PATENT DOCUMENTS

| | | |
|---|---|---|
| JP | 6-28696 | 2/1994 |
| JP | H10-244651 A | 9/1998 |
| JP | 2013-512145 A | 4/2013 |
| JP | 2015-174647 A | 10/2015 |

OTHER PUBLICATIONS

Ebisuzaki et al., "Demonstration Designs for the Remediation of Space Debris From the International Space Station", Acta Astronautica, 112, 2015, pp. 102-113.
Riken et al., "A Blueprint for Clearing the Skies of Space Debris", Apr. 21, 2015, https://www.riken.jp/en/news_pubs/research_news/pr/2015/20150421_2/index.html, 16 pages.
Search Report in International Application No. PCT/JP2019/001655 dated Feb. 19, 2019, 3 pages.
Extended European Search Report in EP Application No. 19910932.3 dated Aug. 2, 2022, 10 pages.
Office Action in CN Application No. 201980089674.4 dated Jan. 30, 2024, 21 pages.

\* cited by examiner

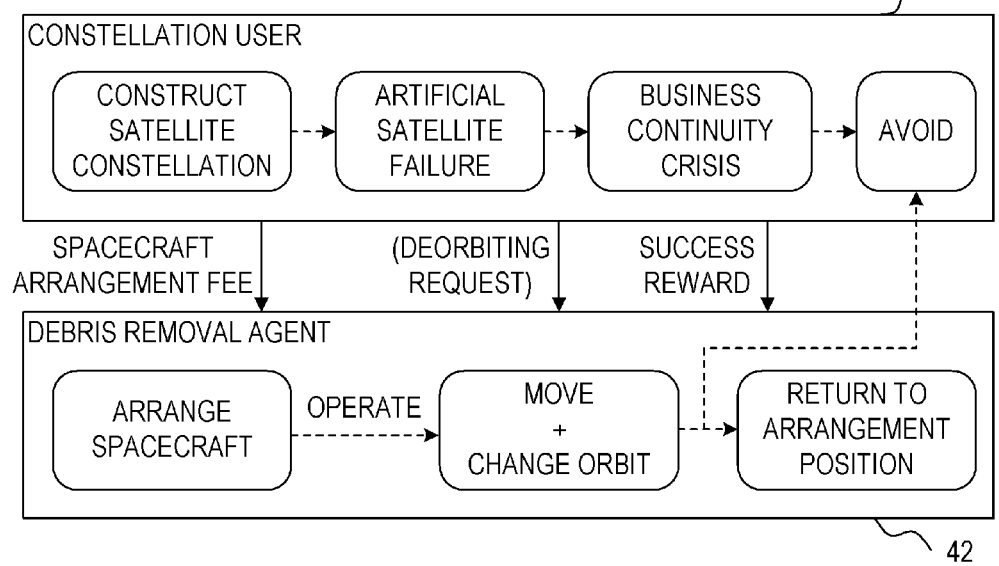
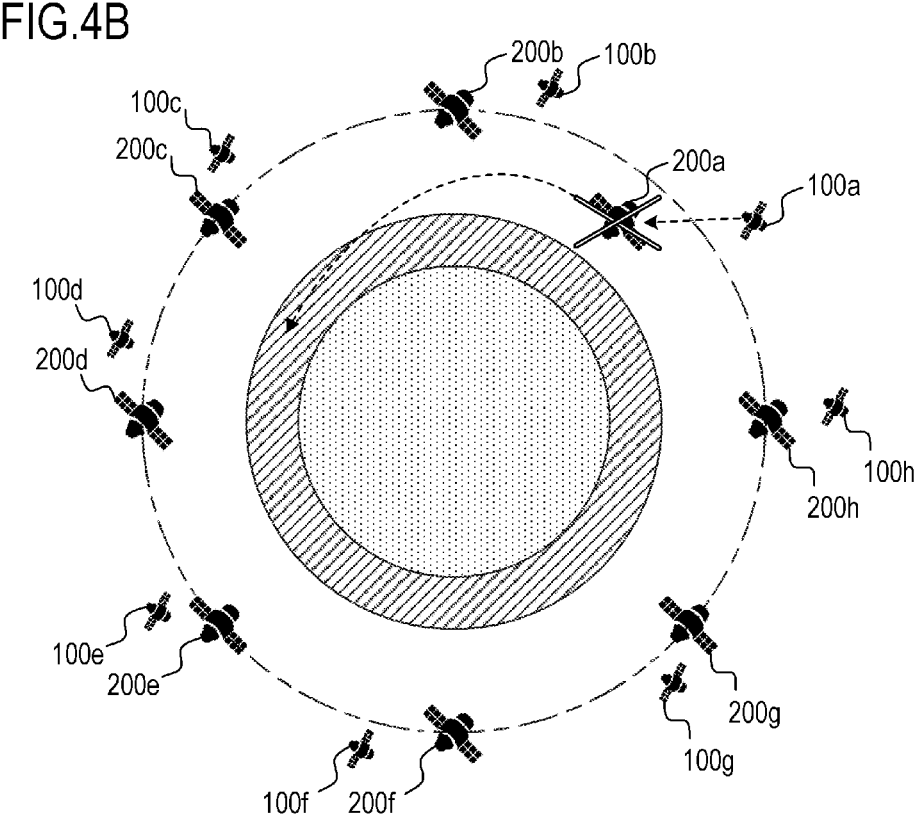

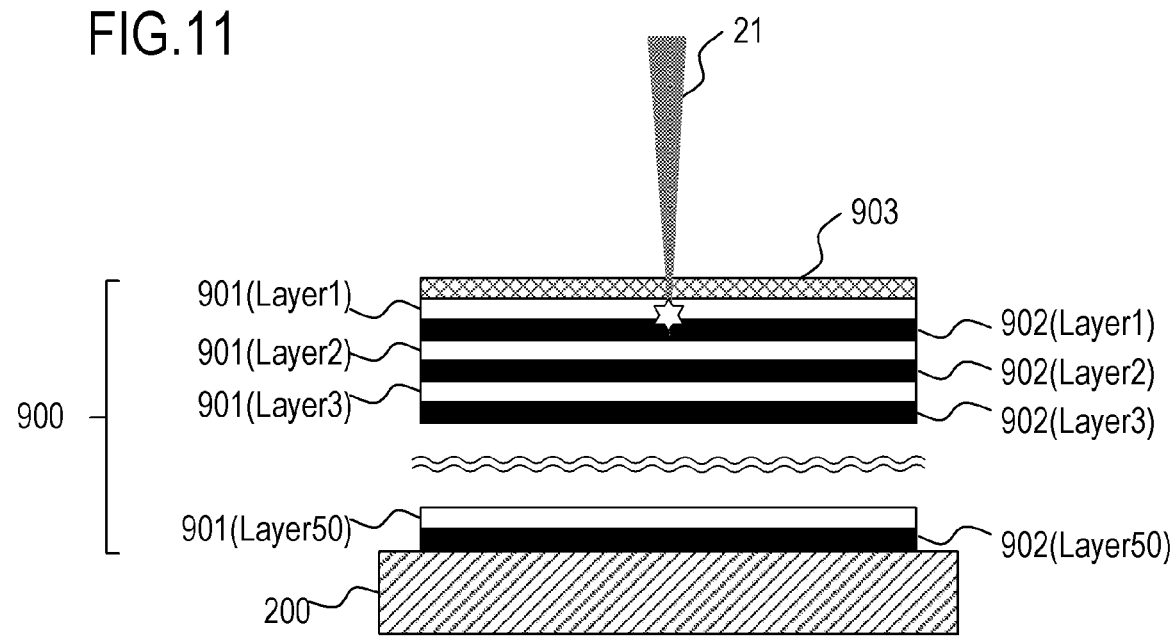

SPACECRAFT AND CONTROL SYSTEM

TECHNICAL FIELD

The present invention relates to a spacecraft and a control system.

BACKGROUND ART

In recent years, increasing debris (space debris) in outer space has become a problem. Debris is made up of, in some embodiments, artificial satellites that are no longer needed, artificial satellites that have failed, parts of artificial satellites that have been detached by a collision or the like. There is a risk that debris may collide with an operational artificial satellite, and when debris of even approximately several centimeters collides with an artificial satellite, the artificial satellite suffers devastating damage. Moreover, there is concern about the problem (the Kessler syndrome) of an explosive increase in debris due to increasing amounts of debris and collisions between the debris and artificial satellites. To prevent an increase in debris, debris has to be removed by incineration or moved to an orbit (a graveyard orbit) on which the debris does not collide with other artificial satellites.

In a technique proposed as a method for removing debris, the debris is adhered to a (debris-removing) artificial satellite, whereupon both enter the atmosphere such that the debris is removed by incineration (PTL 1). In another proposed technique, debris is controlled by ejecting gas from an artificial satellite so as to apply force to the debris (PTL 2).

CITATION LIST

Patent Literature

[PTL 1] Japanese Patent Application Publication No. 2015-174647
[PTL 2] Japanese Translation of PCT Application No. 2013-512145

SUMMARY OF INVENTION

Technical Problem

However, there is a problem with the method of PTL 1 in that when the debris is rotating, it is difficult to approach the debris, and if a collision were to occur, the amount of debris would increase. A problem also exists in that the debris-removing artificial satellite is itself also incinerated, leading to a large increase in cost. With the method of PTL 2, it is necessary to approach the debris in order to apply force to the debris by using the gas ejected by the artificial satellite, and this raises the risk of a collision.

Hence, an object of the present invention is to provide a technique for safely changing the orbit or attitude of a target in outer space.

Solution to Problem

One aspect of the present invention is a spacecraft for changing an orbit or an attitude of a target in outer space by irradiating the target with a laser, the spacecraft includes: a laser apparatus configured to generate the laser; a focusing unit configured to converge the laser; a detecting unit configured to acquire detection information including a distance between the spacecraft and the target; and an irradiation control unit configured to control the focusing unit on the basis of the distance so that the laser converges on the target.

According to this configuration, the spacecraft converges the laser using the focusing unit, and in so doing can change the orbit or the attitude of the target by emitting the laser from a distant position. Therefore, the risk of a collision with the target can be reduced. Here, in some embodiments, the spacecraft is an artificial satellite that controls the orbit or the attitude of the target in outer space by irradiating the target with a laser. Further, the target is an artificial object, including debris (space debris), existing in outer space, or an object (a meteorite or the like, in some embodiments) other than an artificial object. Furthermore, by detecting the target in outer space by using the spacecraft, a small target (debris no larger than 10 centimeters, in some embodiments) can be detected, and the orbit or the attitude thereof can be changed by laser irradiation.

The irradiation control unit is preferably configured to determine an irradiation position of the laser on the target and/or an output value of the laser on the basis of the detection information. According to this configuration, the laser can be emitted at an appropriate output value onto an appropriate location in accordance with the detection information (the state) of the target. Moreover, the irradiation position can be determined so as to avoid locations where laser irradiation may be dangerous.

The irradiation control unit is preferably configured to determine a new irradiation position and/or a new output value on the basis of the detection information acquired after the irradiation with the laser. According to this configuration, the laser can be aimed while being emitted. Moreover, laser irradiation can be performed appropriately in accordance with variation in the target (the position, rotation speed, and so on) caused by laser irradiation. The detection information preferably includes at least one of the distance between the spacecraft and the target, a position, size, shape, captured image, and rotational state of the target.

The irradiation control unit is preferably configured to perform control so that the laser is output at a first output value (a small output) in a case where the laser is to be aimed, and to perform control so that the laser is output at a second output value (a large output), which is larger than the first output value, in a case where the orbit or the attitude of the target is to be changed. According to this configuration, aiming and laser irradiation can be performed using a single laser apparatus (light source). Note that a light source for aiming and a light source for laser irradiation may also be provided separately.

The spacecraft preferably further includes a mirror that reflects the laser emitted from the laser apparatus, and the irradiation control unit is preferably configured to change the emission direction of the laser by using the mirror. According to this configuration, the emission direction of the laser can be changed easily. Note that the emission direction of the laser may also be changed by modifying the orientation of the focusing unit or modifying the orientation of the spacecraft itself.

The irradiation control unit is preferably configured to control the focusing unit so that the laser is converged on a propulsion strengthening member attached to the target, and determine the irradiation position so that the propulsion strengthening member is irradiated with the laser. Further, the propulsion strengthening member preferably includes a transparent member through which the emitted laser passes, and an opaque member that is provided between the transparent member and the target and absorbs the laser such that at least a part thereof is evaporated by energy of the laser.

According to this configuration, thrust generated by ablation produced by the laser irradiation can be increased. The transparent member is a member that transmits the laser, and is constituted by a sheet-form member, a microsphere-shaped member, or the like, in some embodiments. Further, the transparent member is preferably formed from a material that remains transparent over the operating period (10 to 15 years, in some embodiments) of the artificial satellite, even when irradiated with atomic oxygen, radiation, or the like in outer space. Being transparent means that laser (light) absorption and scattering do not occur or occur in a predetermined range. Fluororesin, pure acrylic, silica glass, or the like, in some embodiments, is preferably used as the material of the transparent member. The opaque member is a sheet-form member, in some embodiments, and is preferably formed from a material having a property of expanding as a result of laser absorption. When the opaque member is irradiated with the laser, at least a part of the opaque member is evaporated by the energy of the laser so as to be converted into plasma and ejected. Propulsion is applied to an object to which the propulsion strengthening member is attached by a reaction force Δv to the force with which the opaque member is ejected.

One aspect of the present invention is a control system includes: the spacecraft which is provided in outer space; and a monitoring apparatus provided on Earth, wherein the monitoring apparatus includes: a detecting unit configured to detect a position of the target; and a transmission unit configured to transmit position information about the target to the spacecraft, and wherein the spacecraft further includes: a reception unit configured to receive the position from the monitoring apparatus.

Note that the present invention can be regarded as a laser apparatus including at least some of the configurations described above. The present invention can also be regarded as a control method including at least a part of the processing described above, a program for causing a computer to execute this method, or a computer-readable storage medium non-temporarily storing the program. The configurations and processing described above can be combined with each other in order to construct the present invention, provided that no technical contradictions occur as a result.

Advantageous Effects of Invention

According to the present invention, the orbit or the attitude of a target can be safely changed in outer space.

BRIEF DESCRIPTION OF DRAWINGS

FIGS. 4A and 4B are a view showing an example of a business model of the debris control according to this embodiment.

FIG. 11 is a view showing an example of the special pad according to this embodiment.

DESCRIPTION OF EMBODIMENTS

Embodiment

<Outline>

A spacecraft according to this embodiment is an artificial satellite that controls the orbit or the attitude of a target in outer space by irradiating the target with a laser. By controlling the orbit or the attitude of the target, an unnecessary target, in some embodiments, is removed.

The target is an artificial object, including debris (space debris), existing in outer space, or an object (a meteorite or the like, in some embodiments) other than an artificial object. Debris includes artificial satellites that have become uncontrollable, artificial satellites that have completed their operations and are no longer required, and parts of artificial satellites that have been detached by a collision or the like. In this embodiment, an example in which the target is debris will be described.

Controlling the orbit or the attitude means changing the orbit or the attitude of a target (debris) existing in outer space. Changing the orbit means raising or lowering the altitude of the debris, in some embodiments. In so doing, the debris is either caused to reenter the atmosphere so as to be removed by incineration or moved to an orbit (a graveyard orbit) on which the debris does not collide with other satellites, or the artificial satellite is temporarily moved so as to avoid a collision between the debris and another object. Further, changing the attitude means controlling rotation of the debris, in some embodiments. In so doing, the risk of a collision at the time of physical access is reduced.

Note that in this embodiment, an example in which an artificial satellite is used as the spacecraft will be described, but the spacecraft is not limited to an unmanned spacecraft, and a manned spacecraft may also be used as the spacecraft. The spacecraft may also be a apparatus (a slave unit) mounted on an artificial satellite (a master unit) or the like.

<Debris Removal Method>

Figure 1:
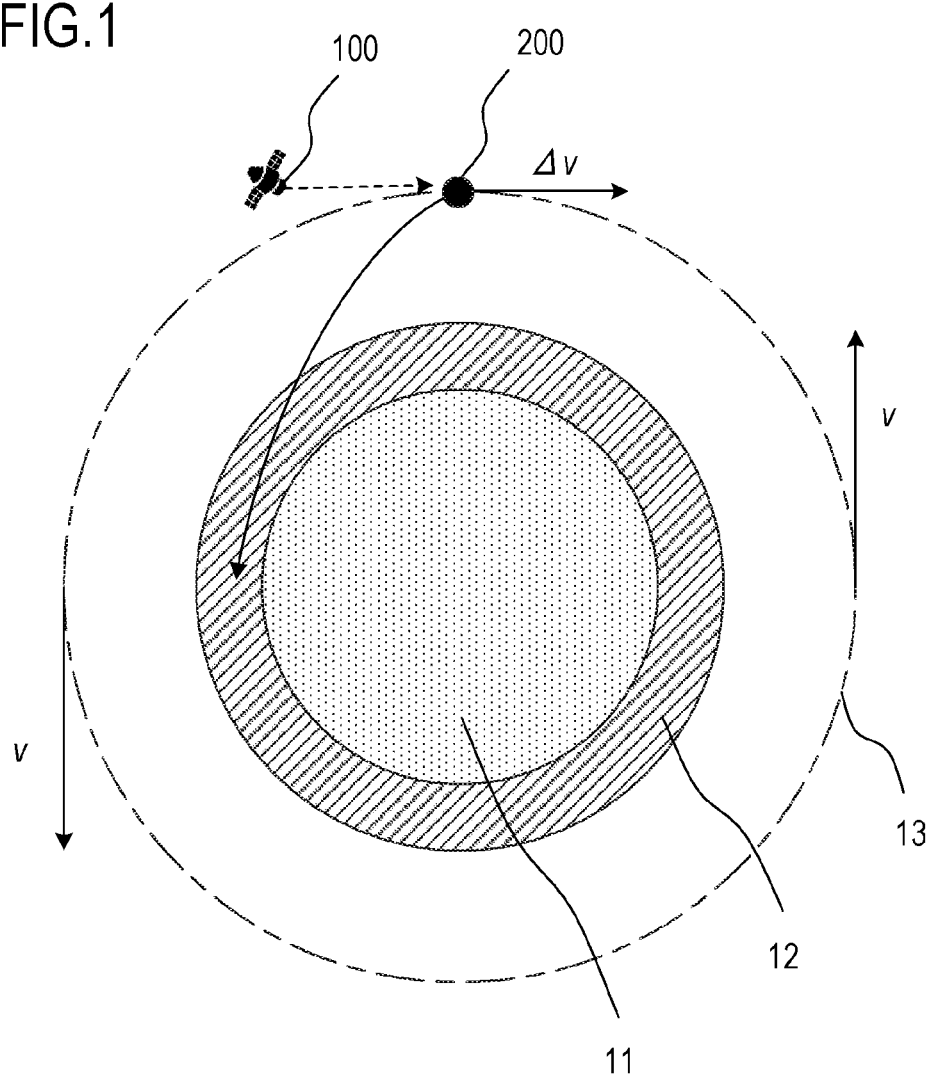
FIG. 1 is a view showing an example of debris control according to an embodiment.

FIG. 1 is a view showing an example of debris removal according to this embodiment. FIG. 1 shows the Earth 11, the atmosphere 12 covering the Earth 11, and an orbit 13 serving as an Earth orbit. Further, a spacecraft 100 is an artificial satellite for irradiating a target with a laser. Debris 200 is an artificial satellite moving along the orbit 13 at a velocity v, and it is assumed that the debris 200 has come to the end of the operational period thereof or the like and is no longer required. The spacecraft 100 generates a reaction force Δv in the debris 200 by irradiating the debris 200 with a laser. The altitude of the debris 200 is lowered, in some embodiments, by the reaction force, whereby the debris 200 reenters the atmosphere and is removed by incineration. Note that the debris removal method is not limited to the method described above, and instead, in some embodiments, the altitude of the debris 200 may be raised (or lowered) so as to move the debris 200 onto an orbit (a graveyard orbit) on which no other artificial satellites exist.

Figure 2:
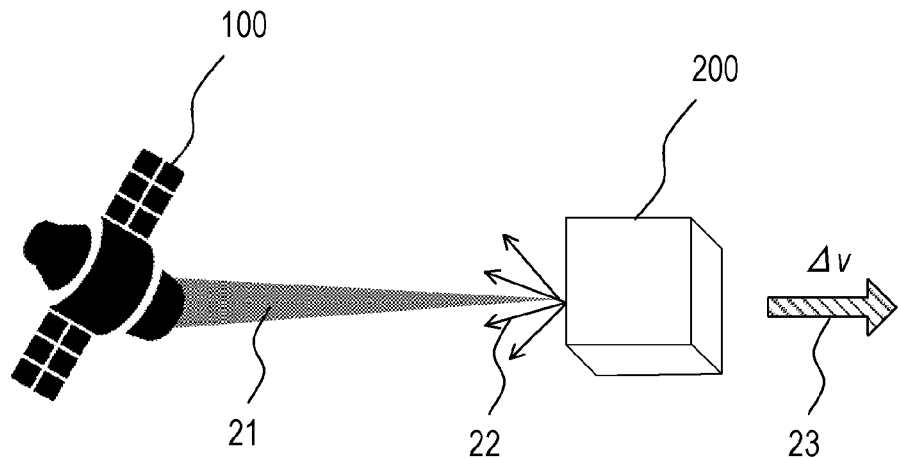
FIG. 2 is a view showing an example of laser irradiation according to this embodiment.

FIG. 2 is a view showing the reaction force generated by the laser irradiation. A laser 21 is a laser emitted by the spacecraft 100. When the debris 200 is irradiated with the laser 21, a substance on the surface of the debris 200 evaporates so as to be converted into plasma and ejected (plasma ablation). When, at this time, the debris 200 receives a reaction to a force (arrow 22) with which the substance is ejected, the reaction force Δv (arrow 23) is generated.

<Business Models of Debris Removal>

The following three models, in some embodiments, may be cited as business models of debris removal using the spacecraft according to this embodiment. The models will be described in order below.

1. Debris removal based on a request from a space environment maintenance organization
2. Debris removal based on a request from a constellation user
3. Debris removal based on a geostationary satellite deorbiting request <<1. Debris Removal Based on a Request from a Space Environment Maintenance Organization>>

Figure 3:
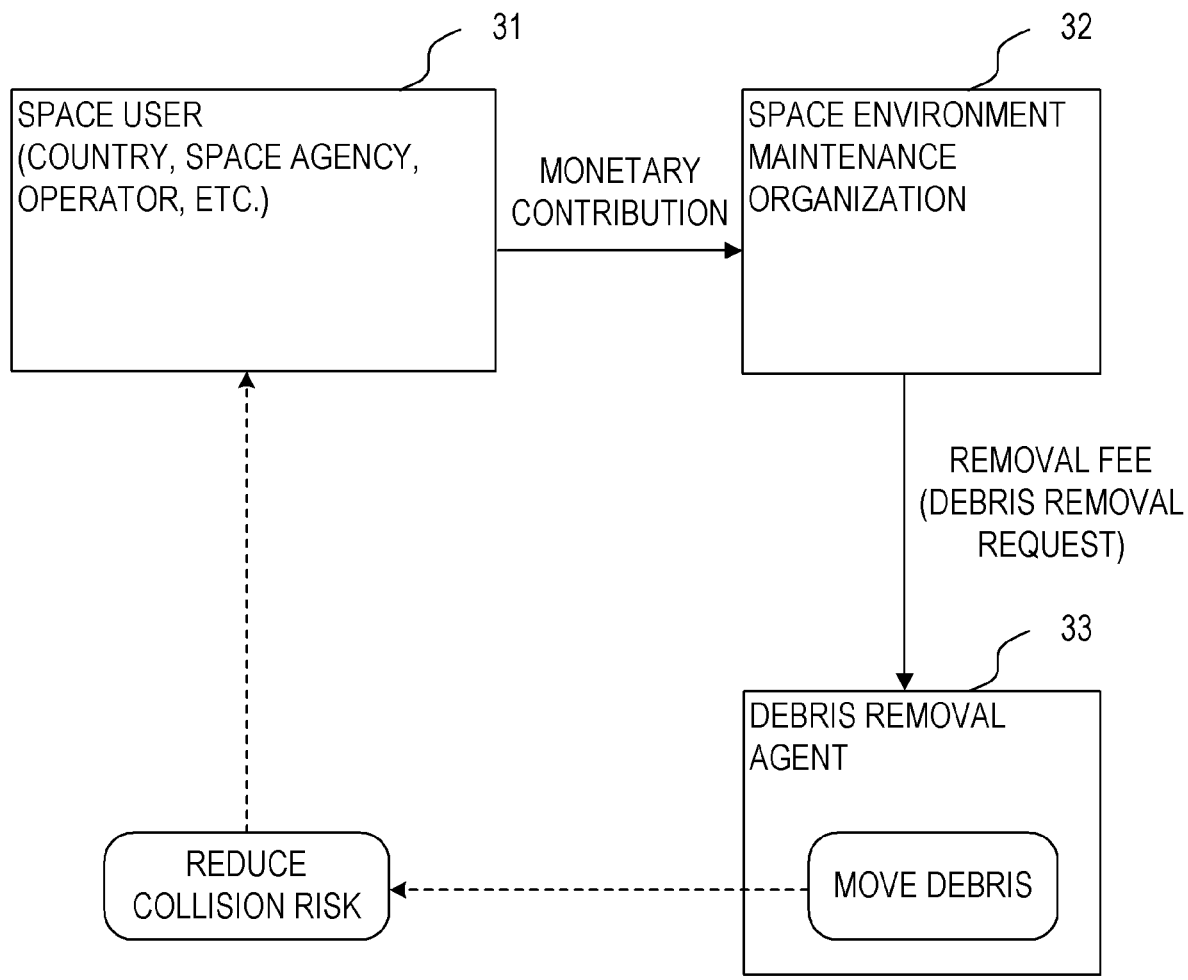
FIG. 3 is a view showing an example of a business model of the debris control according to this embodiment.

FIG. 3 is a view showing an example of a business model using the spacecraft according to this embodiment. A space user 31 is a country, a space agency, an operator, or the like. A space environment maintenance organization 32 is an organization that collections monetary contributions from the space user 31 and observes debris, implements debris removal requests, and so on. A debris removal agent 33 is the contractor that actually removes the debris using the spacecraft according to this embodiment or the like. In some embodiments, the debris removal agent 33 moves (controls the orbit of) the debris or the like upon receipt of a debris removal fee (a debris removal request) from the space environment maintenance organization 32. As a result, the risk of a collision between the debris and an artificial satellite or the like operated by the space user 31 is reduced.

There is concern about the problem (the Kessler syndrome) of an explosive increase in debris occurring when satellites collide with each other in outer space. Moreover, in recent years, the risk of collisions has increased further as the number of small satellites continues to increase, leading to increases in the density of objects. In view of these circumstances, it is assumed that in the near future, there will be demand for actively reducing the amount of debris in space. In this case, removing debris will benefit all users, and it is therefore expected that organizations for collecting removal fees, such as that described above, will be created. Here, the expansion of a debris observation network in outer space is making it possible to be more aware of the risk of collisions. Therefore, the contractor that operates the spacecraft according to this embodiment implements debris removal based on requests from these organizations in accordance with the collision risk.

<<2. Debris Removal Based on a Request from a Constellation User>>

FIG. 4A is a view showing an example of a business model using the spacecraft according to this embodiment. A constellation user 41 is a space agency, an operator, or the like that constructs a satellite constellation. A satellite constellation is a group of satellite systems in which, by arranging a plurality of artificial satellites cooperatively so that the communication ranges thereof do not overlap, the entire surface of the Earth is covered. A debris removal agent 42 is a contractor that receives a spacecraft arrangement fee (an arrangement request) from the constellation user 41 and arranges the spacecraft in relation to the plurality of artificial satellites. Normally, in a constellation, a large number of satellites are launched onto the same orbit, and therefore, when one satellite becomes uncontrollable (artificial satellite failure), there is a risk that the satellite will collide with another satellite (a business continuity crisis).

In this case, the debris removal agent 42, in response to a deorbiting request from the constellation user 41, uses the spacecraft according to this embodiment to change the orbit of the uncontrollable satellite in order to reduce (avoid) the risk of a collision with another constellation satellite. The debris removal agent 42 then receives a success reward from the constellation user 41. Note that during construction of the constellation, a spacecraft is preferably arranged near each of the plurality of artificial satellites constituting the satellite constellation. In so doing, debris can be removed quickly. Note that the business model is not limited thereto, and instead, by arranging one or a small number of spacecraft on a single orbit and removing debris by approaching the debris using a propulsion unit mounted on the spacecraft, debris can be removed at low cost.

FIG. 4B shows a plurality of artificial satellites 200*a* to 200*h* constituting a satellite constellation, and spacecraft 100*a* to 100*h* arranged respectively in relation to the plurality of artificial satellites. FIG. 4B shows an example in which the orbit of the artificial satellite 200*a* is changed (the altitude thereof is lowered) by the spacecraft 100*a* when the artificial satellite 200*a* fails.

<<3. Debris Removal Based on a Geostationary Satellite Deorbiting Request>>

Figure 5:
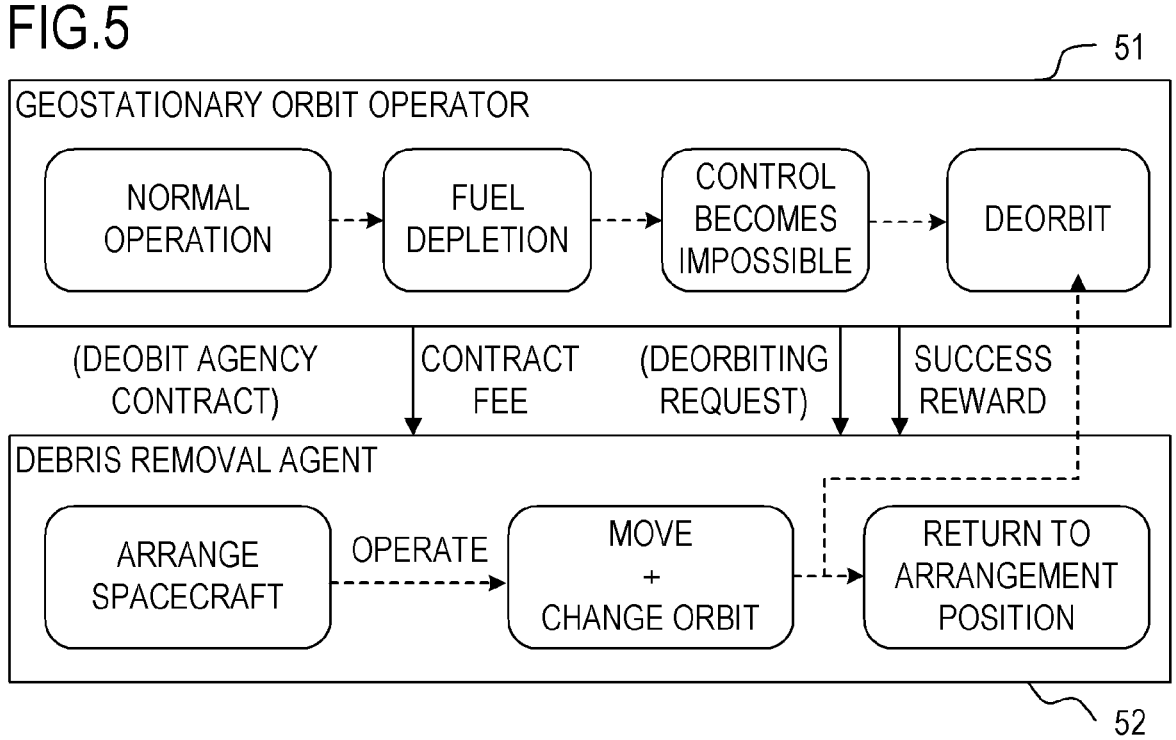
FIG. 5 is a view showing an example of a business model of the debris control according to this embodiment.

FIG. 5 is a view showing an example of a business model using the spacecraft according to this embodiment. A geostationary orbit operator 51 operates a geostationary satellite. A geostationary satellite is an artificial satellite that revolves on a circular orbit with an altitude of approximately 36,000 km with the same period as the rotation period of the Earth. A debris removal agent 52 is a contractor that deorbits the geostationary satellite operated by the geostationary orbit operator 51. Deorbiting means taking an artificial satellite out of orbit. In some embodiments, the geostationary orbit operator 51 concludes a deorbiting contract with the debris removal agent 52 by paying the debris removal agent 52 a contract fee. Then, when the artificial satellite becomes uncontrollable due to fuel depletion or the like during a normal operation, the geostationary orbit operator 51 issues a request to the debris removal agent 52 to take the artificial satellite out of orbit. In response to the request, the debris removal agent 52 changes the orbit of the uncontrollable artificial satellite. As a result, the uncontrollable artificial satellite is taken out of orbit (deorbited). Deorbiting means, in some embodiments, moving to an orbit on which no other artificial satellites exist. The debris removal agent 52 then receives a success reward from the geostationary orbit operator.

The above example is a case in which the fuel (the propellant) is depleted during the operation of the artificial satellite, but management of the fuel remaining in the artificial satellite is highly uncertain, and it is therefore necessary to provide a margin for reliably implementing deorbiting. By using the spacecraft according to this embodiment, the satellite operator does not need to secure a margin for fuel uncertainty or fuel for deorbiting. As a result, the satellite operator can use the spacecraft for orbit control and so on until the fuel is depleted.

<Configuration>

Figure 6:
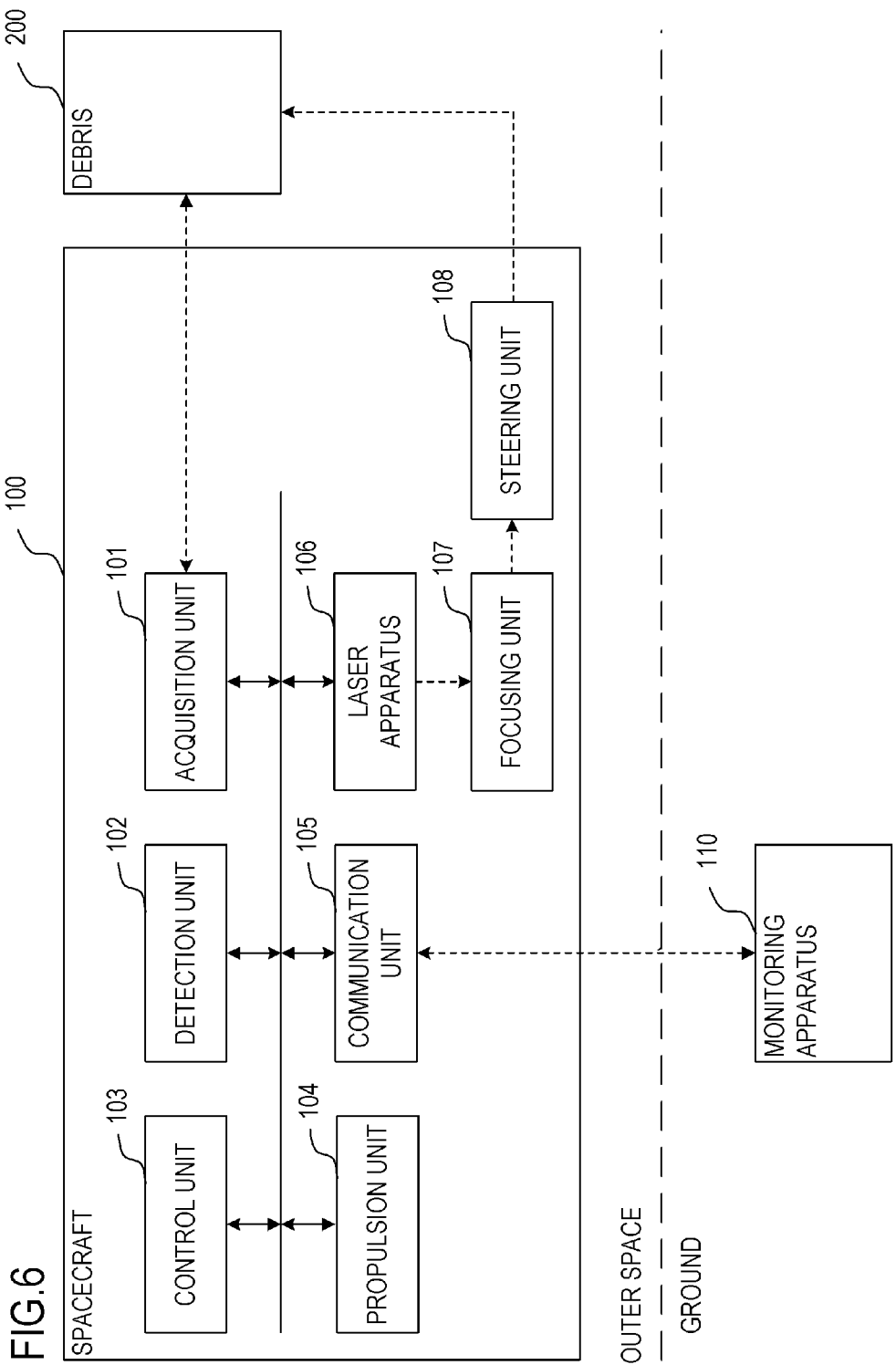
FIG. 6 is a view showing an example of a laser irradiation system according to this embodiment.

FIG. 6 is a view showing a configuration of a laser irradiation system according to this embodiment. The laser irradiation system includes the spacecraft 100, a monitoring apparatus 110, and so on.

<<Spacecraft 100>>

The spacecraft 100 is an artificial satellite having a laser irradiation function. The spacecraft 100 includes an acquisition unit 101, a detection unit 102, a control unit 103, a propulsion unit 104, a communication unit 105, a laser apparatus 106, a focusing unit 107, a steering unit 108, and so on. The spacecraft 100 irradiates the debris 200 with a laser output by the laser apparatus 106 via the focusing unit 107 and the steering unit 108.

The acquisition unit 101 is a function unit for acquiring an image using an imaging unit, not shown in the figures. The acquisition unit 101 also acquires reflection light from a search laser output by the laser apparatus 106, to be described below. The acquisition unit 101 can also be regarded as various sensors.

The detection unit 102 is a function unit for acquiring detection information about the debris 200 on the basis of the image or the reflection light acquired by the acquisition unit 101. The detection information is the distance between the spacecraft 100 and the debris 200, the position, size, and shape of the debris 200, a captured image of the debris 200, the rotational state (attitude) of the debris 200, and so on. The detection unit 102 acquires the distance between the spacecraft 100 and the debris 200 using Lidar (Light Detection and Ranging), in some embodiments.

The control unit 103 (irradiation control means) controls the focusing unit 107 on the basis of the distance between the spacecraft 100 and the debris 200 so that the laser emitted from the laser apparatus 106 converges on the debris 200. When the focusing unit 107 is an optical system, in some embodiments, the focal length of the optical system is adjusted. The control unit 103 is also a function unit for determining the position in which the debris 200 is to be irradiated with the laser and the output value of the laser on the basis of the detection information acquired by the detection unit 102. In some embodiments, the control unit 103 determines the irradiation position of the laser on the basis of the position and attitude of the debris 200, detected by the detection unit 102, and a suitable area for laser irradiation. Suitable areas for laser irradiation are areas excluding locations (a fuel tank or the like, in some embodiments) where laser irradiation may be dangerous. The control unit 103 may also determine the position and timing of laser irradiation in consideration of safe areas on the ground and so on. Safe areas are areas where pieces of the debris 200 that are not burned when the debris 200 reenters the atmosphere or the like can fall. In some embodiments, a safe area is an area at sea that is at least several tens to several hundred nautical miles from shipping routes, aircraft routes, land, and so on. The control unit 103 preferably acquires information relating to suitable areas for laser irradiation and safe areas from the monitoring apparatus 110, to be described below, via the communication unit 105.

The propulsion unit 104 is a function unit for controlling the attitude or the orbit of the spacecraft 100 using a propulsion generation apparatus (an actuator) such as a thruster or a wheel in order to adjust the spacecraft 100 to the required attitude for laser irradiation. There are no particular limitations on the attitude control method, and an existing method such as a three-axis stabilization method, a bias momentum method, or a zero momentum method can be employed.

The communication unit 105 is a function unit for communicating with the monitoring apparatus 110 on the ground. Through the communication unit 105, the spacecraft 100 acquires the rough position (the rough orbit position) of the debris 200, information relating to the suitable areas for laser irradiation and the safe areas, and so on.

The laser apparatus 106 is a apparatus for outputting a laser. In this embodiment, the laser apparatus 106 outputs a high-intensity (high-output) laser by using a pulse laser system in which fiber lasers are used in parallel. The laser apparatus 106 is preferably capable of outputting approximately three times the output value required to generate the ablation to be described below. Note that the laser is not limited to that described above, and various lasers, such as a solid-state laser, may be output. When searching for the debris 200 or aiming the laser at the debris 200, in some embodiments, a low-output laser may be output. Note that a light source for aiming and a light source for laser irradiation may be provided separately. Further, the light source for aiming may emit visible light.

The focusing unit 107 is a member for converging the laser emitted by the laser apparatus 106. By using the focusing unit 107, the spacecraft 100 can emit a laser onto the debris 200 even from a remote location. In this embodiment, the focusing unit 107 uses a typical telescope, but the focusing unit 107 is not limited to a telescope and may be any member for converging the laser. Furthermore, in this embodiment, a position approximately 20 to 1000 meters away from the debris 200 is envisaged as a remote location, but there are no particular limitations on the distance between the spacecraft 100 and the debris 200.

The steering unit 108 is a member for changing the emission direction of the laser output by the focusing unit 107. A movable mirror, in some embodiments, can be used as the steering unit 108. By using the steering unit 108, the spacecraft 100 can easily orient the emission direction of the laser toward the debris 200 even from a remote location. Moreover, the emission direction of the laser can easily be oriented toward the debris 200 from a remote location even when the spacecraft 100 and the debris 200 do not exist on the same orbit, and as a result, the risk of the spacecraft 100 colliding with the debris 200 is reduced.

Figure 7:
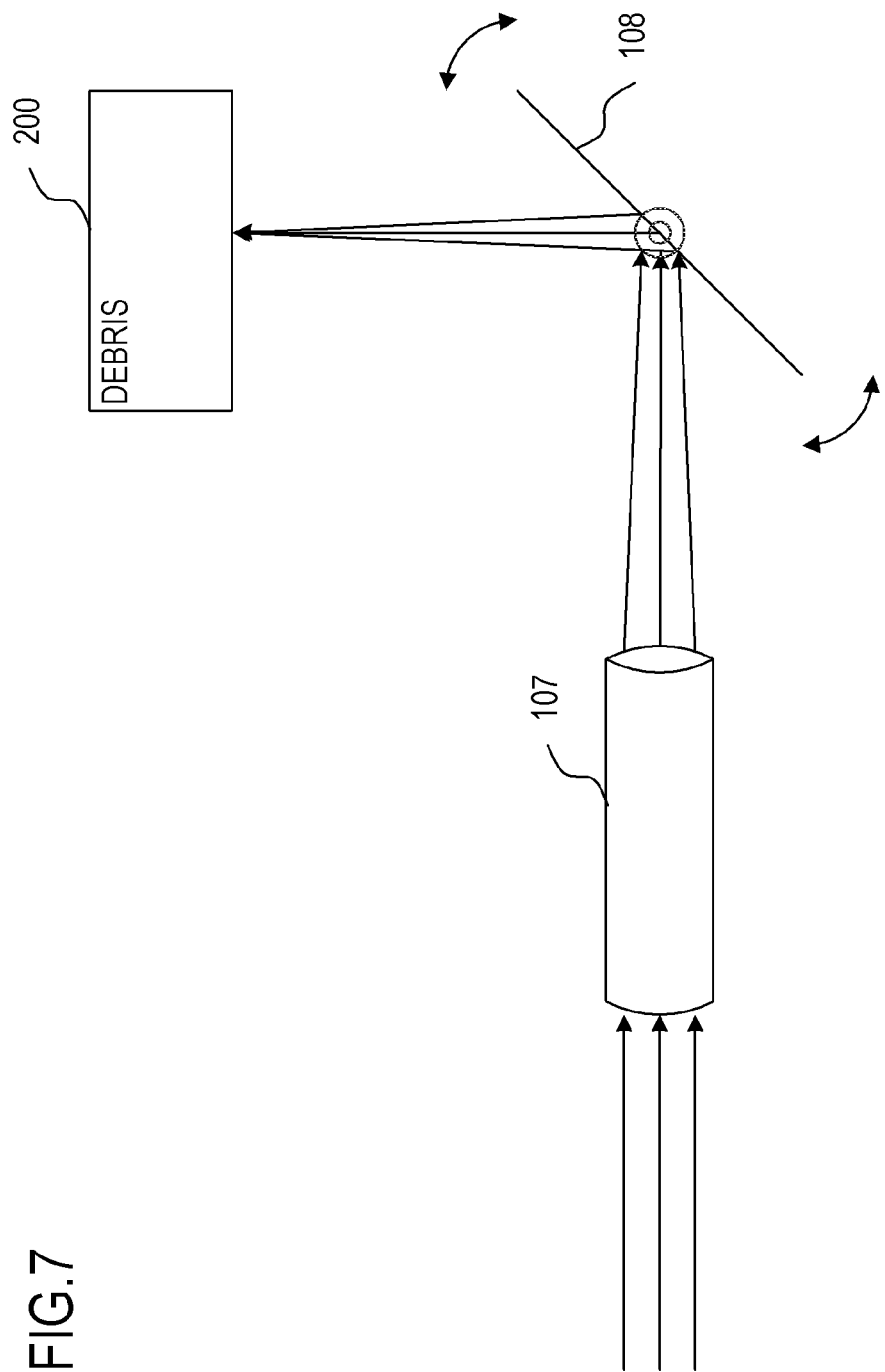
FIG. 7 is a view showing an example of a focusing unit and a steering unit according to this embodiment.

FIG. 7 is a view showing an example of the configurations of the focusing unit 107 and the steering unit 108 according to this embodiment. The laser output from the laser apparatus 106 gradually converges by passing through the focusing unit 107. The laser is then reflected by the steering unit 108, whereby the emission direction thereof is changed.

Note that the method for orienting the laser toward the target is not limited to that described above. In some embodiments, the laser emission direction may be changed by controlling the attitude of the spacecraft 100 itself instead of using the steering unit 108. Further, the laser emission direction may be changed by changing the orientation of the focusing unit 107. Note that in this embodiment, an example in which the focusing unit 107 and the steering unit 108 are provided as parts of the spacecraft 100 is illustrated, but the focusing unit 107 and the steering unit 108 may be provided separately to the spacecraft 100.

<<Monitoring Apparatus 110>>

The monitoring apparatus 110 is a apparatus for detecting the rough position of the debris 200 and transmitting information about the detected debris 200 to the spacecraft 100. The monitoring apparatus 110 may also transmit information relating to the suitable areas for laser irradiation and the safe areas and so on to the spacecraft 100.

<<Debris 200>>

In this embodiment, the debris 200 may include large objects, such as artificial satellites that have become uncontrollable or artificial satellites that have completed their operations and are no longer required, and small objects, such as parts (components such as screws, in some embodiments) of artificial satellites and so on that have been detached by a collision or the like. Note that the subject of the debris 200 is not limited to those described above and includes objects (meteorites and so on, in some embodiments) existing in outer space. Further, there are no particular limitations on the size of the debris 200. Generally, objects in outer space with a size of at least 10 [cm] can be detected from the ground, but in order to detect the debris 200 in outer space, the spacecraft 100 according to this embodiment is capable of detecting even objects of a size equal to or smaller than 10 [cm].

<Processing Content>

Figure 8:
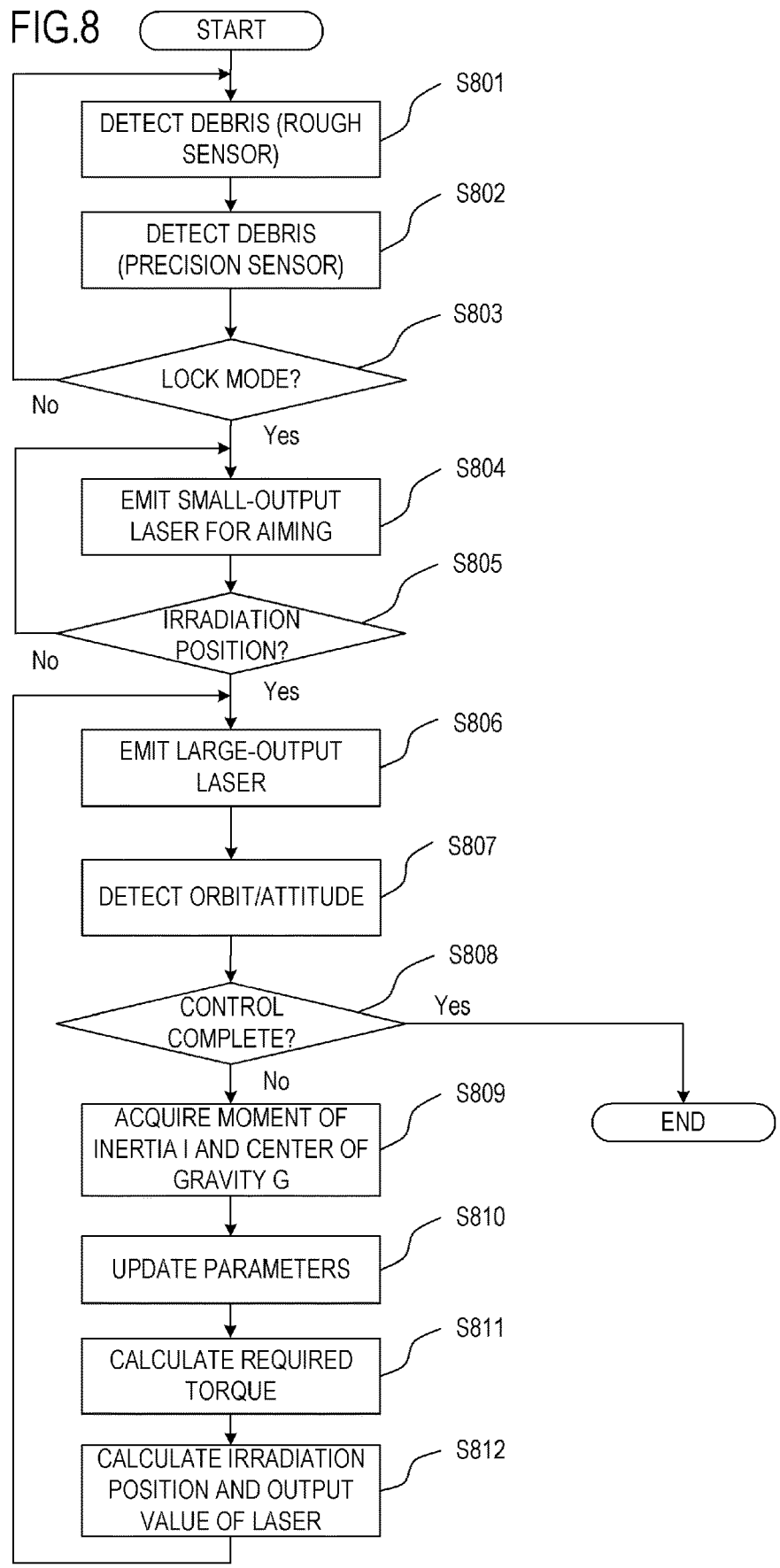
FIG. 8 is a flowchart showing an example of processing according to this embodiment.

FIG. 8 is a flowchart showing an example of processing according to this embodiment.

In step S801, the monitoring apparatus 110 detects the rough orbit (position) of the debris 200. The monitoring apparatus 110 then transmits the detected position of the debris 200 to the spacecraft 100.

In step S802, the detection unit 102 searches for the debris 200 on the basis of the rough position, acquired as described above, and acquires detection information about the debris 200. In some embodiments, the detection unit 102 acquires the distance between the spacecraft 100 and the debris 200, the position, size, and shape of the debris 200, a captured image of the debris 200, the rotational state (attitude) of the debris 200, and so on as the detection information.

In step S803, the control unit 103 determines whether or not an irradiation mode of the spacecraft 100 is set in a lock mode. The lock mode is a mode for irradiating the debris 200 detected by the spacecraft 100 with the laser. When the lock mode is set, the processing advances to step S804, and when the lock mode is not set, the processing returns to step S801.

In step S804, the spacecraft 100 emits the laser in order to aim the laser. More specifically, the laser emitted by the laser apparatus 106 is converged by passing through the focusing unit 107. The emission direction thereof is then changed by the steering unit 108. In this embodiment, the control unit 103 controls the focusing unit 107 on the basis of the distance between the spacecraft 100 and the debris 200 (the detection information) so that the laser converges on the debris 200. Here, in this embodiment, when aiming the laser, the control unit 103 sets the output value of the laser at "small (first output value)".

Figure 9:
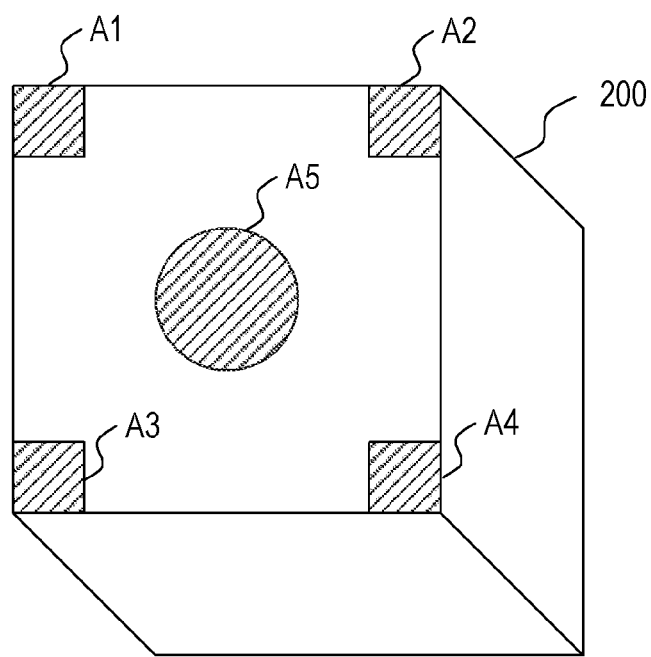
FIG. 9 is a view showing an example of irradiation positions according to this embodiment.

FIG. 9 is a view showing an example of irradiation positions on the debris 200. By emitting the laser onto corner portions (areas A1 to A4, in some embodiments) on each surface of the debris, in some embodiments, rotational torque is generated. Further, by emitting the laser alternately onto opposing corners, external force for moving the debris 200 can be applied. Emitting the laser alternately onto opposing corners means emitting the laser in order of area A1→area A4→area A1→area A4, in some embodiments. External force for moving the debris 200 may also be applied by emitting the laser onto a central portion (an area A5, in some embodiments).

In step S805, the control unit 103 determines whether or not the aim position described above matches the position that was actually irradiated. In some embodiments, the control unit 103 acquires the position that was actually irradiated on the basis of the image acquired by the acquisition unit 101. When the positions match, the processing advances to step S806, and when the positions do not match, the processing returns to step S804.

In step S806, the spacecraft 100 emits the laser in order to irradiate the debris 200 therewith. In this embodiment, when the orbit or the attitude of the target is to be changed, the control unit 103 sets the output value of the laser at "large (second output value)".

In step S807, the detection unit 102 detects the orbit or the attitude of the debris 200.

In step S808, the control unit 103 determines whether or not control of the debris 200 is complete. In some embodiments, control is complete in a case where the debris 200 has been moved to a target orbit during orbit control, a case where the debris 200 has stopped rotating (spinning) during attitude control, and so on. When control is complete, the processing is terminated, and when control is not complete, the processing advances to step S809.

In step S809, the control unit 103 determines a moment of inertia I or a center of gravity G of the debris 200 on the basis of the detection information described above.

In step S810, the control unit 103 updates various parameters. In some embodiments, when attitude control is performed on the debris 200, the control unit 103 updates the parameters so that a torque (referred to as a measured torque N1) measured on the basis of the detection information described above matches an assumed torque (referred to as an assumed torque N2). Here, an assumed thrust F and a length r from the focus position to the center of gravity are updated (adjusted) as the parameters. The assumed thrust F can be adjusted by changing the intensity (level) of the emitted laser, in some embodiments. Here, the measured torque N1 is determined as follows using an assumed acceleration α, the moment of inertia I, a measured initial attitude change ω0, and a post-irradiation attitude change ω1. Further, the assumed torque N2 is determined as follows using the assumed thrust F and the length r. Note that a conversion table for holding and managing the parameters for each piece of debris may be provided.

<<Measured Torque N1>>

$$N1 = I \times \alpha = I \times (\omega1 - \omega0)$$

<<Assumed Torque N2>>

$$N2 = F \times r$$

In step S811, the control unit 103 calculates the torque required to change the attitude of the debris 200 or move the debris 200.

In step S812, the control unit 103 determines the irradiation position of the laser on the basis of the required torque. Any position on the debris 200 may be set as the irradiation position of the laser, but the irradiation position is preferably determined so that the laser is emitted onto a propulsion strengthening member (a special pad) to be described below. Further, the irradiation position is preferably determined so as to avoid locations where laser irradiation may be dangerous. The control unit 103 preferably acquires these possibly dangerous locations from the monitoring apparatus 110 via the communication unit 105. Furthermore, the control unit 103 calculates the output value of the laser on the basis of the required torque. The processing then returns to step S806.

By detecting the orbit and the attitude of the target following laser irradiation and feeding the detected orbit and attitude back to control of the laser irradiation position and output value in the manner described above, the orbit or the attitude of the target is controlled.

<Estimation Results of Orbit Control/Attitude Control>

Estimation results of the remote orbit control performed by the spacecraft 100 according to this embodiment will now be described. In these estimations, it is assumed that the spacecraft 100 emits a 100 [W] laser from a location 100 meters away from the debris 200. Further, large, cube-shaped debris with 1-meter sides and a weight (M) of 1 [t] is envisaged as the debris 200. In this case, it was estimated that as a result of laser irradiation, the debris 200 receives a reaction force ($\Delta v$) of 20 [m/s]. According to this estimation result, by emitting the laser continuously for $10^6$ seconds, the altitude of the debris 200 can be moved approximately 66 [km].

<<Estimation Conditions>>
  Output value of laser: 100 [W]
  Size of debris: 1 [$m^3$]
  Weight of debris: 1 [t]
<<Estimation Results>>
  Reaction force: 20 [m/s]
  Movement amount: 66 [km] (in $10^6$ [s])

Further, when remote rotation control (attitude control) was performed under similar estimation conditions to those described above, an estimation result according to which the angular acceleration ($\alpha$) of the debris 200 is $3\times10^{-5}$ [$rad/s^2$] was acquired. According to this estimation result, by emitting the laser continuously for $10^6$ seconds, the angular velocity ($\omega$) of the debris 200 reaches 30 [rad/s]. Here, a moment of inertia ($I=2\times a^2\times M/3$) about a rotary axis passing through one side of a cube having sides a and a mass M is used in the above estimation.

<<Estimation Results>>
  Angular acceleration: $3\times10^{-5}$ [$rad/s^2$]
  Angular velocity: 30 [rad/s] (in $10^6$ [s])

According to the above estimation results, the orbit and the attitude of the 1 [t] debris 200 can be changed even with a laser apparatus of approximately 100 [W]. A 100 [W] laser can be realized by a small, cube-shaped laser apparatus with sides of only 30 [cm], and as a result, the laser apparatus can be mounted on a small artificial satellite, which is expected to lead to a reduction in cost.

<Special Pad>

A special pad that is attached to the debris 200 in this embodiment will now be described. The special pad according to this embodiment is a member that generates ablation in response to laser irradiation and strengthens the reaction force of plasma generated as a result. The special pad can also be regarded as a propulsion strengthening member.

The special pad is envisaged as being attached to the artificial satellite in advance, prior to launch, but may also be attached in outer space. Further, the special pad is preferably attached to the areas A1 to A5 in FIG. 9, but there are no particular limitations on the attachment position, shape, and size of the special pad. In some embodiments, the special pad may be attached in a strip shape on the surface of the debris 200 or attached over the entire surface of the debris 200. Furthermore, a plurality of strip-shaped special pads may be provided, and the angles of the special pads may be set to be modifiable.

<<Propulsion Strengthening Using Special Pad>>

Figure 10A:
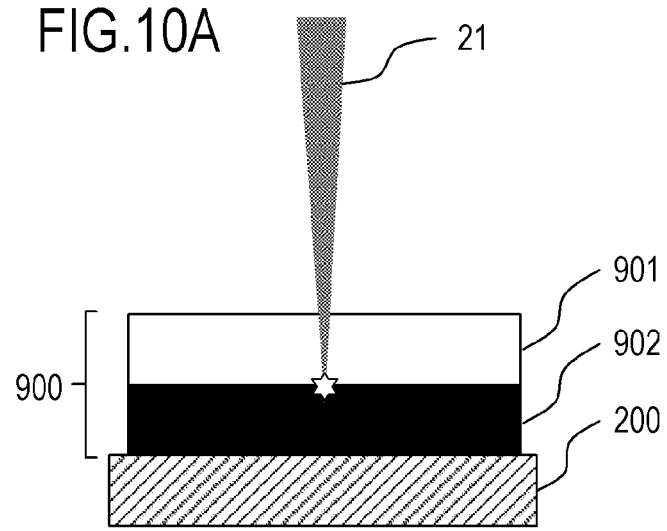
FIGS. 10A to 10D are a view showing an example of an increase in propulsion generated by a special pad according to this embodiment.
Figure 10B:
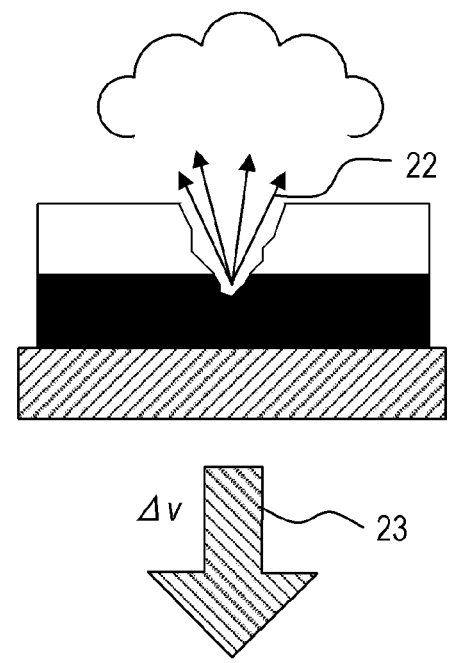
Figure 10C:
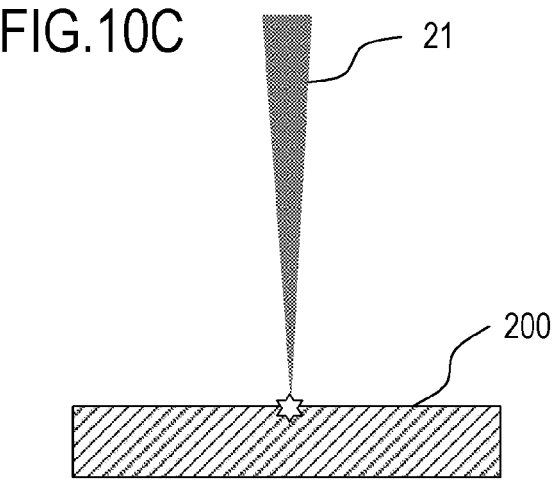
Figure 10D:
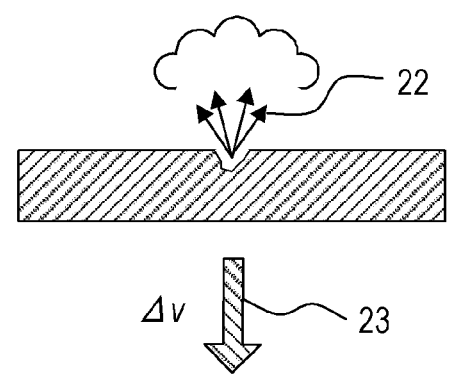

FIGS. 10A to 10D are views showing examples of propulsion strengthening using a special pad 900 according to this embodiment. FIG. 10A shows a basic structure of the special pad 900 according to this embodiment. The special pad 900 is a member that is attached to the surface of the debris 200 and includes a transparent member 901, an opaque member 902, and so on. The structure of the special pad 900 will be described in detail below. FIG. 10B shows the force (arrow 22) with which a part of the opaque member 902 is ejected by ablation as a result of the laser irradiation shown in FIG. 10A, and the reaction force $\Delta v$ (arrow 23) thereto. FIG. 10C shows an example of a case in which the surface of the debris 200 is irradiated with the laser 21 without using the special pad 900. FIG. 10D shows the force (arrow 22) with which a part of the debris 200 is ejected by ablation as a result of the laser irradiation shown in FIG. 10C, and the reaction force $\Delta v$ (arrow 23) thereto. Here, when FIG. 10B and FIG. 10D are compared, in FIG. 10D, the reaction force $\Delta v$ is generated by the force (arrow 22) with which the ejected substance is discharged into outer space, whereas in FIG. 10B, a reaction force $\Delta v$ of several orders of magnitude is generated by the force with which the ejected substance pushes the transparent member 901 out.

<<Configuration of Special Pad>>

FIG. 11 is a view showing an example of the special pad 900 according to this embodiment. The special pad 900 according to this embodiment includes the transparent member 901, the opaque member 902, a protective member 903, and so on.

The transparent member 901 is a member through which the laser described above passes. There are no particular limitations on the shape of the transparent member 901, but in this embodiment, a sheet-form member will be described as an example. The transparent member 901 is preferably formed from a material that remains transparent over the operating period (10 to 15 years, in some embodiments) of the artificial satellite, even when irradiated with atomic oxygen, radiation, and so on in outer space. Being transparent means that laser (light) absorption and scattering do not occur or occur in a predetermined range. In this embodiment, an example in which the transparent member 901 is formed from fluororesin will be described. The reason for this is that the binding energy of a C—F bond in fluororesin is strong, thereby making the fluororesin heat-resistant, oxidation-resistant, and so on. Note that as long as the transparent member 901 is transparent, pure acrylic, silica glass, and so on may be used instead.

The opaque member 902 is a member provided between the debris 200 and the transparent member 901. There are no particular limitations on the shape of the opaque member 902, but in this embodiment, a sheet-form member will be described as an example. The opaque member 902 has a property of expanding as a result of absorption of the laser described above, and the energy of the laser causes at least a part of the opaque member 902 to evaporate so as to be converted into plasma and ejected. The opaque member 902 is preferably an opaque member formed from a material that evaporates easily (has a low boiling point) but has a boiling point at which evaporation does not occur in response to solar heat. In some embodiments, the opaque member 902 can be formed from acrylic containing a black material (black radium or the like, in some embodiments). Note that the opaque member 902 is not limited to the acrylic described above. In some embodiments, alcohol may be used as the opaque member.

The protective member 903 is a member provided on at least one surface of the special pad 900 and used to protect the transparent member 901 and so on throughout the operating period of the artificial satellite. The protective member 903 preferably has at least one function among radiation resistance, light blocking (preventing heat input by sunlight), and oxidation resistance (atomic oxygen resistance). Note that the protective member 903 may also have a function for preventing abrasion against other objects. There are no particular limitations on the material of the protective member 903, but perfluorocarbon, silica, fluororesin, a polyimide film (Kapton (registered trademark) or the like, in some embodiments), a metal such as aluminum, or the like can be used. Note that the protective member 903 preferably evaporates in response to laser irradiation. Also note that the protective member 903 does not necessarily have to be provided.

Figure 12A:
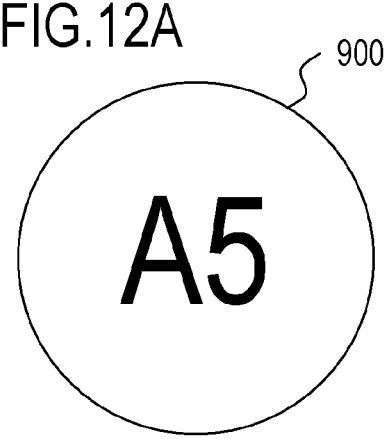
FIGS. 12A to 12C are a view showing an example of the special pad according to this embodiment.
Figure 12B:
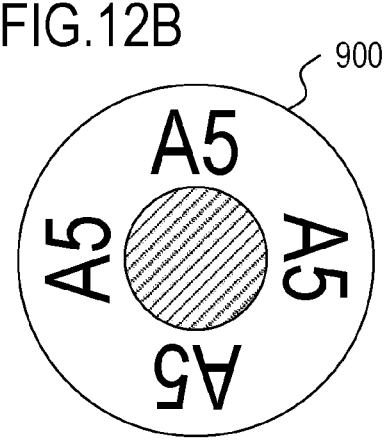
Figure 12C:
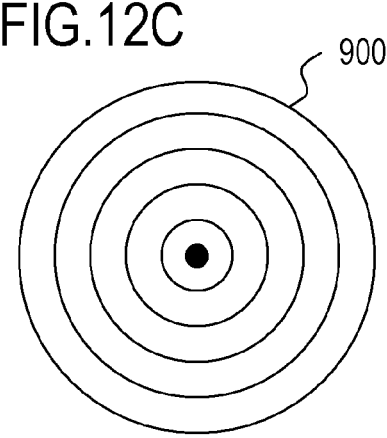

Further, in this embodiment, a mark such as a symbol is applied to the surface of the special pad 900 (the surface of the protective member 903, in some embodiments). This is so that the position of the special pad 900 can be detected easily and the special pad 900 can be identified when aiming the laser. FIGS. 12A to 12C are views showing examples of marks. FIG. 12A shows an example in which alphanumeric characters are applied to the surface of the special pad 900. There are no particular limitations on the content of the alphanumeric characters. In the example shown in FIG. 12A, the alphanumeric characters "A5" are attached to the area A5 shown in FIG. 9. The mark may be a symbol, an alphanumeric character, a figure, a one-dimensional code, a two-dimensional code, or the like. Alternatively, coloring may be applied to the surface as the mark. Further, as shown in FIG. 12B, a laser irradiation area (the shaded portion in FIG. 12B) and a mark application area may be provided separately on the surface of the special pad 900. In so doing, the mark application area remains on the surface after one laser irradiation, and therefore the position detection and identification described above can be performed again during the next laser irradiation. Furthermore, as shown in FIG. 12C, lines indicating targets may be applied to the surface of the special pad 900 (FIG. 12C). Note that the marks described above are examples and may be modified as appropriate in accordance with the shape and attachment site of the special pad 900.

<<Lamination Structure>>

As shown in FIG. 11, the special pad 900 according to this embodiment has a structure in which one or more transparent members 901 and opaque members 902 are laminated alternatively. There are no particular limitations on the number of laminated layers, but 10 to 100 layers are preferably provided. FIG. 11 shows an example in which 50 layers are provided. The special pad 900 according to this embodiment is a member with a thickness of approximately $(0.1+0.1)\times50=10$ [mm], in some embodiments, where the transparent member 901 and the opaque member 902 are both 0.1 [mm] and 50 layers of each are laminated.

Furthermore, in this embodiment, the transparent member 901 and the opaque member 902 have a laminated structure. Therefore, even when the opaque member 902 (Layer 1) evaporates in response to one laser irradiation, during the next laser irradiation, the laser 21 passes through the second layer of the transparent member 901 (Layer 2) so as to evaporate the second layer of the opaque member 902 (Layer 2). As a result of this configuration, even when laser irradiation is performed repeatedly, the reaction force can be strengthened as long as at least one layer of each of the transparent member 901 and the opaque member 902 remains.

Advantageous Effects of this Embodiment

By having the configuration described above, the spacecraft 100 can change the orbit and the attitude of the debris 200 remotely. Thus, the need for the spacecraft 100 to approach the debris 200 can be eliminated, and as a result, the risk of a collision between the spacecraft 100 and the debris 200 can be reduced.

Further, by having the configuration described above, the spacecraft 100 can perform orbit control and attitude control on debris of approximately 1 [t] even when a small laser apparatus with an output value of approximately 100 [w] is used. As a result, reductions can be expected in the size and cost of the spacecraft on which the laser apparatus is mounted. Moreover, by irradiating the special pad described above with the laser as a target, the orbit and the attitude of the debris can be changed using an even smaller laser apparatus.

Furthermore, by having the configuration described above, the spacecraft 100 can change the orbit and the attitude of the debris 200 by changing the orientation of the laser using steering means, in some embodiments, even when the spacecraft 100 is not tracking the debris 200. As a result, the amount of fuel used to move the spacecraft 100 can be reduced.

Moreover, by having the configuration described above, the spacecraft 100 can control the orbit and the attitude of the spacecraft 100 itself or the debris 200 by laser irradiation alone, without using a propulsion apparatus (a thruster, in some embodiments). Thus, the need to secure fuel and so on in order to move the artificial satellite after the operating period thereof is complete can be eliminated, and as a result, the operating cost can be suppressed.

(Others)

The configurations of the embodiments and modified examples described above can be used in appropriate combinations within a scope that does not depart from the technical spirit of the present invention. Further, the present invention may be realized by applying appropriate modifications thereto within a scope that does not depart from the technical spirit thereof.

REFERENCE SIGNS LIST

100 Spacecraft
101 Acquisition unit
102 Detection unit
103 Control unit
104 Propulsion unit
105 Communication unit
106 Laser apparatus
107 Focusing unit
108 Steering unit
110 Monitoring apparatus
200 Debris
900 Special pad
901 Transparent member
902 Opaque member
903 Protective member

The invention claimed is:

1. A method for changing an orbit or an attitude of a target in outer space by irradiating the target with a laser, the method comprising:
   acquiring detection information including a distance between a spacecraft and the target with a detecting unit of the spacecraft;
   controlling a focusing unit of the spacecraft with an irradiation control unit of the spacecraft on the basis of the distance to converge a laser generated by a laser apparatus on the target, and to determine an irradiation position of the laser on the target;
   acquiring a captured image of the target by an acquisition unit of the spacecraft;
   acquiring the position on the target that has been irradiated by the laser with the irradiation control unit on the basis of the captured image, and determining a new irradiation position on the basis of the position that has been irradiated with the laser;

controlling the laser with the irradiation control unit to output at a first output value in a case where the laser is emitted for aiming, and controlling the laser to output at a second output value with the irradiation control unit, which is larger than the first output value, in a case where the orbit or the attitude of the target is to be changed.

2. The method according to claim 1, wherein the irradiation control unit determines an initial irradiation position of the laser on the target on the basis of the captured image, irradiates the initial irradiation position with the laser, acquires the position on the target that has been irradiated with the laser on the basis of the captured image, and determines a new irradiation position on the basis of the position that has been irradiated with the laser.

3. The method according to claim 1, wherein the irradiation control unit determines an irradiation position of the laser on the target and/or an output value of the laser on the basis of the detection information.

4. The method according to claim 1, wherein the irradiation control unit determines a new irradiation position and/or a new output value on the basis of the detection information acquired after the irradiation with the laser.

5. The method according to claim 1, wherein the detection information includes at least one of the distance between the spacecraft and the target, a position, size, shape, captured image, and rotational state of the target.

6. The method according to claim 1, wherein the irradiation control unit changes the emission direction of the laser by using a mirror that reflects the laser emitted from the laser apparatus.

7. The method according to claim 1, wherein a propulsion strengthening member is attached to the target, and wherein the irradiation control unit further controls the focusing unit to converge the laser on the propulsion strengthening member, and to determine the irradiation position so that the propulsion strengthening member is irradiated with the laser.

8. The method according to claim 7, wherein the propulsion strengthening member includes:
    a transparent member through which the emitted laser passes; and
    an opaque member that is provided between the transparent member and the target and absorbs the laser such that at least a part thereof is evaporated by energy of the laser.

9. The method of claim 1, wherein a monitoring apparatus provided on Earth comprising a detecting unit detects a position of the target; and a transmission unit transmits position information about the target to the spacecraft, and a reception unit of the spacecraft receives the position from the monitoring apparatus.

10. A non-transitory computer-readable storage medium storing instructions that, when executed by a computer, cause a computer to execute the method of claim 1.

* * * * *

UNITED STATES PATENT AND TRADEMARK OFFICE
CERTIFICATE OF CORRECTION

PATENT NO. : 12,049,331 B2
APPLICATION NO. : 17/423995
DATED : July 30, 2024
INVENTOR(S) : Tadanori Fukushima et al.

Page 1 of 1

It is certified that error appears in the above-identified patent and that said Letters Patent is hereby corrected as shown below:

In the Claims

At Column 15, Line 6, "aiming, and" should be -- aiming; and --.

Signed and Sealed this
Eighth Day of April, 2025

Coke Morgan Stewart
*Acting Director of the United States Patent and Trademark Office*